United States Patent [19]

Cagliero

[11] 4,128,657
[45] * Dec. 5, 1978

[54] METHOD OF AND FEED FOR FARMING EGG-LAYING HENS USING NIFUROXAZIDE

[75] Inventor: Germano Cagliero, Ivrea (Turin), Italy

[73] Assignee: Marxer S.p.A., Loranze d'Ivrea (Turin), Italy

[*] Notice: The portion of the term of this patent subsequent to Oct. 17, 1995, has been disclaimed.

[21] Appl. No.: 785,458

[22] Filed: Apr. 7, 1977

[30] Foreign Application Priority Data

Apr. 23, 1976 [IT] Italy .............................. 67989 A/76

[51] Int. Cl.² ............................................. A61K 31/34
[52] U.S. Cl. ........................................ 424/285; 426/2
[58] Field of Search ........................................ 424/285

[56] References Cited

U.S. PATENT DOCUMENTS 3,773,943  11/1973  Welch et al. ........................ 424/285

FOREIGN PATENT DOCUMENTS 1427M  8/1962  France.

*Primary Examiner*—V. D. Turner
*Attorney, Agent, or Firm*—Biebel, French & Nauman

[57] ABSTRACT

Healthy egg-laying hens are systematically nourished with a feed containing 20 to 40 ppm nifuroxazide; the optimal proportion is about 30 ppm.

4 Claims, No Drawings

METHOD OF AND FEED FOR FARMING EGG-LAYING HENS USING NIFUROXAZIDE

CROSS-REFERENCE TO RELATED APPLICATIONS

Cross-reference is made to related copending applications Ser. Nos. 785,457; 785,459; and 785,515, all filed concurrently herewith in the name of the same inventor and all commonly assigned.

This invention concerns the farming of egg-laying hens. The main object of the present invention is to increase the ovideposition both in percentage and in size. A further object is to increase the growth in weight of the hens, while a still further object is to attain all these advantages possibly with appreciable saving in the feed consumption.

It has been found that the above mentioned objects can be attained with the use of nifurozazide as a stimulant. Therefore one object of the present invention consists in a method of farming egg-laying hens, characterized by nourishing the hens with a feed containing from 20 to 40 ppm (preferably 25-35 ppm) of nifuroxazide, the optimal content being substantially 30 ppm. A further object of the present invention is a feed for egg-bearing hens characterized in that the feed contains the above indicated porportions of nifuroxazide.

Nifuroxazide, also known as 5'-nitrofurfurylidene-4-hydroxybenzohydrazide presents the chemical formula:

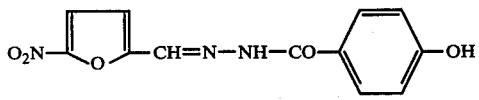

The substance is a microcrystalline, oderless, tasteless, lemon-yellow colored powder, M.P. 296°-299° C. (with decomposition). It is insoluble in water, ethyl ether and chloroform, soluble is dimethylformamide, scantly soluble in 95% ethanol, in methanol, acetone and ethyl acetate. It is a furan derivative. Furan derivatives find application in veterinary medicine. In particular, according to some studies, it seems that meat poultry affected by diarrhea can be cured with relatively high doses of nifuroxazide amounting to at least 600 ppm and normally ranging around 800 ppm (as referred to feed).

(In the present specification, parts and percentages are intended by weight, unless they are expressly indicated differently).

The therapy consists in administering to the poultry for a few days during illness a feed containing the hereinbefore indicated doses of nifuroxazide.

The present invention is based on the discovery that nifuroxazide influences positively the ovideposition when it is administered to egg-bearing hens in small doses, as hereinbefore indicated, more than 20 times smaller the antidiarrheic doses, practically for the whole farming period or at least for the larger part of it. It is not a cure for sick animals affected by diarrhea but rather a systematic nourishing of wholesome animals.

An extremely important advantage of nifuroxazide consists in the fact that if administered orally, this substance does not present any possibility of absorption, is deprived of acute or chronic toxicity and of teratogenous activity even if administered in doses twice as great as the therapeutical doses.

PRACTICAL APPLICATION

Tests described later on, have been performed on 4,000 5.5-month old hens of the Hubbard Golden Comet stock having a weight oscillating around 1,850 g. The animals have been divided into four groups (hereinafter indicated with A, B, C and D) of 1,000 subjects each. The farming has been carried on for 12 months with the "on battery" system of three hens per coop.

All the animals have been fed during the entire farming period with a compounded integrated feed, whose composition is indicated in Table 1. The chemical analysis of the feed is indicated in Table 2.

TABLE 1

| Ingredients | kg |
| --- | --- |
| Soy flour (44% prot.) | 8 |
| Sunflower seed flour (45% prot.) | 4 |
| Meat flour | 3 |
| Fish flour | 4 |
| Dehydrated alfalfa flour | 3 |
| Barley flour | 4 |
| Corn flour | 55 |
| Wheat bran | 5 |
| Yellow corn gluten | 1 |
| Wheat germ | 4 |
| Dry torula yeast | 1 |
| Lard | 1 |
| Mineral calcium carbonate | 4,5 |
| Dicalcium phosphate (dihydrated) | 1,5 |
| Sodium chloride | 0,5 |
| Vitamin and oligomineral complex (°) | 0,5 |
|  | 100,0 |

| (°) Vit.A | 3.000.000 U.I. | B.H.T. | 1.000 mg |
| --- | --- | --- | --- |
| Vit.D$_3$ | 200.000 U.I. | Co | 150 mg |
| Vit.E | 1.000 mg | Fe | 10.000 mg |
| Vit.B$_1$ | 400 mg | I | 100 mg |
| Vit.B$_2$ | 1.000 mg | Mn | 15.000 mg |
| Vit.B$_{12}$ | 3 mg | Cu | 300 mg |
| Vit.PP | 4.000 mg | Zn | 10.000 mg |
| Vit.K | 200 mg | | |
| D-pantothenic acid | 2.000 mg | | |
| Folic acid | 200 mg | | |
| Choline chloride | 150.000 mg | | |
| DL-methionine | 30.000 mg | | |
| Vegetal support q.s. | to 1,000 g | | |

TABLE 2

|  | % weight |
| --- | --- |
| Humidity | 12.25 |
| Ashes | 8.26 |
| Raw protein | 18.12 |
| Raw fat | 4.39 |
| Raw fiber | 3.60 |
| Non-nitrogeneous extracts | 53.38 |
|  | 100.00 |

Group A was considered as "control group." Nifuroxazide was added to the feed of groups B, C and D in the ratio of 10, 20 and 30 ppm respectively. The addition was effected in the form of a pre-mixture with lactose at the 0.5% concentration in order to favour the distribution uniformity in the feed. The feed was administered in the form of flour, in the amount of 150 g per subject, per day.

The results obtained are summarized, month by month, in Tables 3-6.

TABLE 3

| | Deposition percentages | | | | % Increase of D with |
| --- | --- | --- | --- | --- | --- |
| Month | A | B | C | D | respect to A |
| Nov. | 45.6 | 45.3 | 46.0 | 46.5 | 2.0% |
| Dec. | 71.4 | 71.7 | 72.0 | 72.5 | 1.5% |
| Jan. | 67.1 | 68.6 | 69.1 | 71.0 | 5.8% |
| Feb. | 68.0 | 69.5 | 70.3 | 71.9 | 5.7% |

TABLE 3-continued

| Month | Deposition percentages | | | | % Increase of D with respect to A |
|---|---|---|---|---|---|
| | A | B | C | D | |
| Mar. | 73.8 | 74.4 | 76.0 | 78.0 | 5.7% |
| Apr. | 72.9 | 73.2 | 75.0 | 77.1 | 5.8% |
| May | 71.7 | 72.3 | 74.1 | 75.9 | 5.9% |
| Jun. | 67.1 | 68.6 | 69.2 | 72.4 | 7.9% |
| Jul. | 64.7 | 66.2 | 66.9 | 70.1 | 8.3% |
| Aug. | 60.4 | 62.3 | 63.0 | 68.3 | 13.1% |
| Sept. | 59.8 | 60.4 | 61.3 | 65.5 | 9.5% |
| Oct. | 56.2 | 56.8 | 57.3 | 63.1 | 12.3% |

TABLE 4

(Average weight of eggs)

| Month | A | B | C | D | % Increase of D with respect to A |
|---|---|---|---|---|---|
| Nov. | 55,1 | 55,0 | 55,2 | 55,2 | 0,2% |
| Dec. | 55,6 | 55,6 | 55,7 | 55,7 | 0,2% |
| Jan. | 56,2 | 56,3 | 56,3 | 56,4 | 0,4% |
| Feb. | 57,6 | 57,6 | 57,8 | 57,8 | 0,4% |
| Mar. | 58,7 | 58.8 | 59,1 | 59,8 | 1,9% |
| Apr. | 61,4 | 61,5 | 62,4 | 63,3 | 3,1% |
| May | 63,8 | 64,0 | 64,5 | 65,9 | 3,3% |
| Jun. | 64,6 | 64,7 | 64,8 | 66,2 | 2,5% |
| Jul. | 65,0 | 65,2 | 65,3 | 66,3 | 2,0% |
| Aug. | 65,4 | 65,6 | 65,6 | 66,5 | 1,9% |
| Sept. | 65,7 | 65,9 | 66,0 | 66,9 | 1,8% |
| Oct. | 65,9 | 66,1 | 66,2 | 67,3 | 2,1% |

TABLE 5

(Feed consumption per one dozen eggs)

| Month | A | B | C | D | $\frac{A - D}{A} \cdot 100$ |
|---|---|---|---|---|---|
| Nov. | 1,830 | 1,888 | 1,802 | 1,788 | 2.3% |
| Dec. | 2,000 | 2,010 | 1,936 | 1,900 | 5% |
| Jan. | 2,143 | 2,100 | 2,050 | 1,984 | 7.4% |
| Feb. | 2,306 | 2,239 | 2,262 | 2,177 | 5.6% |
| Mar. | 2,412 | 2,361 | 2,310 | 2,224 | 7.8% |
| Apr. | 2,530 | 2,488 | 2,416 | 2,310 | 8.7% |
| May | 2,580 | 2,562 | 2,500 | 2,421 | 6.2% |
| Jun. | 2,651 | 2,616 | 2,570 | 2,466 | 7.0% |
| Jul. | 2,694 | 2,665 | 2,613 | 2,511 | 6.8% |
| Aug. | 2,725 | 2,704 | 2,661 | 2,600 | 4.6% |
| Sept. | 2,757 | 2,731 | 2,700 | 2,652 | 3.8% |
| Oct. | 2,793 | 2,775 | 2,740 | 2,700 | 3.3% |

TABLE 6

(Weight increase)

| Month | A | B | C | D |
|---|---|---|---|---|
| Nov. | 1870 | 1892 | 1887 | 1880 |
| Dec. | 1945 | 1930 | 1968 | 1999 |
| Jan. | 1989 | 2038 | 2050 | 2058 |
| Feb. | 2040 | 2090 | 2098 | 2146 |
| Mar. | 2118 | 2166 | 2183 | 2231 |
| Apr. | 2174 | 2203 | 2278 | 2295 |
| May | 2216 | 2236 | 2304 | 2320 |
| Jun. | 2268 | 2280 | 2311 | 2376 |
| Jul. | 2299 | 2312 | 2326 | 2406 |
| Aug. | 2320 | 2330 | 2340 | 2428 |
| Sept. | 2346 | 2365 | 2370 | 2457 |
| Oct. | 2361 | 2382 | 2390 | 2495 |
| Weight increase in 12 months | 491 | 490 | 503 | 615 |
| % weight increase | 26% | 26% | 26,7% | 32,7% |

Table 3 clearly shows the favourable effect of nifuroxazide on the percentage deposition of the eggs when its dose in the feed corresponds to that herein previously recommended (30 ppm- Group D). From the % increases tabulated in the last column it is easy to calculate that the average % annual increase amounts to 7.0% and that in the months of June–October the average % increase reaches 8.8%.

Table 4 shows that the administration of nifuroxazide according to the present invention has a consequence also a certain increase of the average weight of the eggs laid. The % increases tabulated in the last column evidences an annual average increase of 1.65% and an average increase in the period June–October of 2.06%.

Table 5 illustrates the average consumption of feed as referred to the dozen eggs laid. In the last column are indicated the saving percentages of feed attained in Group D with respect to Group A. It can be easily calculated from this column that the average annual saving amounts to 5.7%.

Finally Table 6 clearly shows that, while the subjects of Groups A, B and C are increased in weight (in the course of the 12 month-farming) by about 26%, Group D has reached a 32.7% increase.

TOXICOLOGICAL TESTS

A wide toxicological study on nifuroxazide has been performed at the Virology and Immunology Laboratory of the Pharmacy Faculty of Paris, France.

As regards the acute toxicity it has been demonstrated that 4 g/kg in the rats do not cause death and 8 g/kg kill only 30% of the animals. Besides it can be stated that this 30% mortality is not due to the furanic compound as such but to the mechanical action of the large amount of ingested substance.

In the determination of chronic toxicity, always in the rat, with a dose of 100 mg/kg per day of nifuroxazide for a period of 20 days it has not been possible to detect at the necroscopic examination either macroscopical or histological lesions.

Besides, nifuroxazide administered daily for 6 months to "Rhesus" monkeys and to "Wistar" rats at the dose of 10-250-1000 mg/kg has not determined any toxicity symptom.

A toxicologic study on chickens and rabbits has been performed at the Institute of General Pathology and Veterinary Pathologic Anatomy of Turin, Italy.

As regards the acute toxicity, none of the chickens treated with a 2 g/kg dose of nifuroxazide died; the necroscopic examination has not detected macroscopic or histological lesions.

No cases of death occurred even in the chronic toxicity tests performed for four months by installation and for 6 months by administration with the feed in a dosage respectively 15 times and 16 times greater than the therapeutical one.

The residue control tests performed on the organs of chickens treated for 5 days with 10 and 20 mg/kg per day respectively of nifuroxazide (therapeutical- and twice the therapeutical dose) showed negative results.

On the acute toxicity tests performed on rabbits of the New Zealand stock, probed for 4 days with 5 g/kg of nifuroxazide, all the subjects survived without displaying any particular symptomatology.

Besides, administration of nifuroxazide incorporated in the ratio of 1% in the diet of rabbits of the white neozealandese stock for the duration of 3 months did not cause occurrence of any particular symptomatology.

The hematological and hematochemical examinations of the percentage weight of the organs and the necroscopic and anatomo-pathological examination, did not detect any particular alteration related to the treatment.

TERATOGENETICAL TESTS

This study was performed at the Consultox Laboratories of London on 90 rabbits of the Dutch Belted stock and on 150 mice of the Charles River stock.

Nifuroxazide administered to rabbits from the 6th to the 18th day of pregnancy at the dose of 250-500-1,000 mg/kg and to mice from the 6th to the 15th day of pregnancy at the dose of 500-1,000-2,000 mg/kg did not exhibit any teratogenous activity.

PHARMACOKINETICAL STUDY

This study was performed at the Pharmacy Faculty of Paris, France, by the following methodologies:
- determination of nifuroxazide in the intestine after a certain period from its administration, sufficient to allow its passage into the blood,
- determination in the blood at different time intervals from the administration.

The first experiment consists of introducing into the small intestine of anesthesized rat an exact amount of nifuroxazide, through a small incision at the duodenum region. After a certain period of time (5 hours), in relation to the normal duration of the intestinal transit, the amount remaining in the intestine is determined.

Having treated 5 animals in the hereinbefore mentioned way the following results have been obtained.

|  | Amount of nifuroxazide | |  |
| --- | --- | --- | --- |
|  | Administered | Found | % Found |
|  | 66 mg | 67 mg | 101,3 |
|  | 67 mg | 64 mg | 95,5 |
|  | 52,5 mg | 50 mg | 95,2 |
|  | 65 mg | 66,5 mg | 102,2 |
|  | 62 mg | 64 mg | 103 |
| Average | 62,5 mg | 62,3 mg | 99,4 |

The results show that, taking into account any errors made during the experiment and the sensitivity of the method, practically all the nifuroxazide which has been introduced is found again in the intestine, even aften 5 hours.

Rats weighing 150-180 g treated with 1 ml of a 10% suspension of nifuroxazide (100 mg) have been used for the search of nifuroxazide in the blood; blood samples were taken from the rats 1 hr, 2 hrs and 3 hrs after administration of the compound. Notwithstanding this maximum dosage, it has not been possible to evidence the presence of nifuroxazide in the blood of these animals by a method which allows detection of a concentration as low as 1 μg/ml.

Further experiments performed on the blood of dogs treated orally with massive doses of nifuroxazide (200 mg/kg), as well as on the blood of subjects treated with doses slightly greater than the usual therapeutical doses, have given negative results, even though the analytical method allowed detection of a hematical concentration of nifuroxazide of 0.4 mg/ml.

Nifuroxazide kinetics is therefore limited to an intestinal transit with no absorption.

I claim:
1. A method for promoting the growth and ovideposition of egg-laying poultry hens, comprising nourishing the hens with a feed containing 20-40 ppm of nifuroxazide.
2. A method according to claim 1, wherein the porportion of nifuroxazide is 30 ppm.
3. A feed for promoting the growth and ovideposition of egg-laying poultry hens containing 20-40 ppm of nifuroxazide.
4. A feed according to claim 3, containing 30 ppm of nifuroxazide.

* * * * *